US006500914B1

(12) United States Patent
Brack et al.

(10) Patent No.: US 6,500,914 B1
(45) Date of Patent: Dec. 31, 2002

(54) METHOD FOR END-CAPPING POLYCARBONATE RESINS AND COMPOSITION FOR USE IN SAME

(75) Inventors: Hans Peter Brack, Etten-Leur (NL); James Anthony Cella, Clifton Park, NY (US); Dennis Karlik, Bergen op Zoom (NL); Paul Michael Smigelski, Jr., Schenectady, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/682,724

(22) Filed: Oct. 10, 2001

(51) Int. Cl.$^7$ .............................................. C08G 64/00
(52) U.S. Cl. ....................................... 528/196; 528/198
(58) Field of Search .................................. 528/196, 198

(56) References Cited

U.S. PATENT DOCUMENTS

| | | | |
|---|---|---|---|
| 3,442,854 | A | 5/1969 | Curtius et al. |
| 4,310,656 | A | 1/1982 | Brunelle |
| 4,323,668 | A | 4/1982 | Brunelle |
| 4,363,905 | A | 12/1982 | Brunelle |
| 4,661,567 | A | 4/1987 | Tyrel et al. |
| 4,680,372 | A | 7/1987 | Rosenfeld |
| 4,886,875 | A | 12/1989 | Gay et al. |
| 5,026,817 | A | 6/1991 | Sakashita et al. |
| 5,097,002 | A | 3/1992 | Sakashita et al. |
| 5,142,018 | A | 8/1992 | Sakashita et al. |
| 5,151,491 | A | 9/1992 | Sakashita et al. |
| 5,340,905 | A | 8/1994 | Kühling et al. |
| 5,696,222 | A | 12/1997 | Kaneko et al. |

FOREIGN PATENT DOCUMENTS

| | | |
|---|---|---|
| EP | 0 360 578 A2 | 3/1990 |
| EP | 0 980 861 A1 | 2/2000 |

*Primary Examiner*—Terressa M. Boykin
(74) *Attorney, Agent, or Firm*—Oppedahl & Larson LLP

(57) ABSTRACT

A method for end-capping polycarbonate resins, comprising the step of processing a mixture comprising a polycarbonate having free hydroxyl-end groups and an end-capping reagent in a melt transesterification reaction to produce a polycarbonate resin, wherein the end-capping reagent comprises a mixture of:(a) at least one species of a symmetrical activated aromatic carbonate, and (b) at least one species of a symmetrical non-activated aromatic carbonate, whereby said end-capping reagent reacts with at least some of the free hydroxyl end-groups of the polycarbonate to produce an end-capped polycarbonate resin.

46 Claims, No Drawings

METHOD FOR END-CAPPING POLYCARBONATE RESINS AND COMPOSITION FOR USE IN SAME

BACKGROUND OF INVENTION

This application relates to a method for end-capping polycarbonate resins and to end-capping compositions useful in such a method.

Polycarbonates prepared by the reaction of a dihydric phenol (such as bisphenol A, "BPA") and a diaryl carbonate (such as diphenyl carbonate, "DPC") in a melt transesterification process generally contain significant levels of uncapped chains (7–50%) as compared to interfacially prepared polycarbonates. These uncapped chains can have a significant impact on the resulting properties of polycarbonate, and it is therefore desirable in many instances to include an end-capping agent with a higher capping efficiency than DPC during or after the polymerization reaction which terminates the uncapped chains.

Known end-capping reagents are frequently carbonate or ester derivatives of phenol. U.S. Pat. No. 4,680,372 discloses the use of phenyl benzoate as an end-capping reagent to terminate polymers formed by melt polymerization of a bisphenol and an aromatic dicarboxylic acid such as terephthalic acid and/or isophthalic acid. U.S. Pat. No. 4,886,875 describes preparation of polyarylate compositions using diaryl carbonates, polyarylcarbonate oligomers or polyarylcarbonate polymers as end-capping agents. In particular, the Examples of the "875 patent teach the use of diphenyl carbonate or highly endcapped polycarbonate oligomers as end-capping agents. Unfortunately these end-capping reagents all yield the byproduct phenol, which then rapidly re-equilibrates with the polycarbonate to limit the achievable molar mass and end-cap level. Long reaction and devolatization times are required to counteract this effect.

Therefore known end-capping reagents are frequently also carbonate or ester derivatives of electronegatively-ortho-substituted phenols which are more reactive than DPC. U.S. Pat. No. 4,310,656 describes the transesterification of of bis (ortho-haloaryl)carbonates, haloaryl aryl carbonates, and a dihydric phenol, and indicates that controlled aryl end-capping is achieved. U.S. Pat. No. 4,363,905 describes the transesterification of of bis(ortho-nitroaryl) carbonates, nitro aryl aryl carbonates and a dihydric phenol, and indicates that controlled aryl end-capping is achieved. It should be noted though that both bis(ortho-haloaryl) carbonates and bis(ortho-nitroaryl)carbonates have quite different properties than DPC. Thus the replacement of DPC by these compounds requires considerably different equipment and operating conditions than typically found in melt polycarbonate production. In addition The use of these compounds results in the production of colored or potentially toxic or explosive byproducts or ones that produce gaseous products containing chlorine upon combustion. Thus from product quality (transparency), handling, and environmental considerations there is a demand for the use of carbonates that are free from chlorine and nitro-activating groups. U.S. Pat. No. 4,661,567 describes the use of vinylene carbonate derivatives as end-capping agents which are added to preformed polycarbonates to terminate the polymers.

U.S. Pat. No. 5,696,222 describes a process for production of a terminally-blocked polycarbonate by melt transesterification of a dihydric phenol and a diaryl carbonate in the presence of an asymmetric substituted phenol ester or carbonate as an end-capping agent, and in particular end-capping agents which are salicylic acid derivatives. European Patent Publication No. 0 980 861 discloses an improved method for making such derivatives. These end-capping agents are derived from one salicylate (activated) and one non-activated phenol. While such end-capping agents are effective, they are not without their drawbacks. Specifically, such asymmetric carbonates require two separate steps for their preparation (generation of a chloroformate from one of the phenols, followed by condensation with the second phenol). This two step process adds significantly to the cost of the end-capping agent. An additional deficiency of this method is that the asymmetric mixed carbonates prepared in this way are often contaminated with traces of nitrogen- and halogen-containing impurities and with symmetrical carbonates derived from one or both of the phenols used in the reaction. As a consequence, in order to obtain materials of suitable quality for polymerization, purification is often both essential and difficult.

The "222 patent also describes the use of di-activated carbonates, for example derived from two salicylates to either couple polycarbonate chains to increase molecular weight, or to cap phenolic hydroxyl end groups. This method suffers from the fact that only salicylate (activated) end groups can be incorporated. These salicylate end groups are different from the conventional phenol or alkyl-substituted phenol end groups typically found in commercial polycarbonate resins. In addition, capping is accompanied by coupling so that it is difficult to only cap without increasing molecular weight, or to systematically vary the endcap level without varying also the polycarbonate molecular weight. Indeed, while increasing levels of conventional end-capping agents tend to decrease molecular weight, in the case of the di-activated species there are opposing tendencies where the end-capping function reduces molecular weight while the coupling function tends to increase molecular weight, making the characteristics of the product difficult to predict or control.

SUMMARY OF INVENTION

It has now been found that end-capping reagents which comprise a mixture of different species, including at least: (a) a symmetrical activated aromatic carbonate, and (b) a symmetrical non-activated aromatic carbonateprovide effective end-capping of polycarbonate resins and can avoid the deficiencies described above. Thus, the present invention provides an end-capping reagent, and a method for preparing an end-capped polycarbonate resin using the reagent. In accordance with an embodiment of the method of the invention a mixture comprising a polycarbonate having free hydroxyl-end groups and an end-capping reagent is processed in a melt transesterification reaction to produce a polycarbonate resin.

The carbonates of the end-capping reagent reacts with at least some of the free hydroxyl end-groups of the polycarbonate to produce an end-capped polycarbonate resin.

DETAILED DESCRIPTION

End-Capping Reagent: This application relates to an end-capping composition comprising a mixture of different species, including at least: (a) one species of symmetrical activated aromatic carbonate, and (b) one species of symmetrical non-activated aromatic carbonate.

This invention further relates to a method of making polycarbonate resin which uses an end-capping reagent of this type.

As used in the specification and claims of this application, the term "symmetrical activated aromatic carbonate" refers to compounds containing two phenolic groups linked through a carbonate bridge, with each phenol group being substituted with the same electronegative and therefore activating substituent at the ortho position. Many of these symmetrical activated aromatic carbonates can be represented by the general formula:

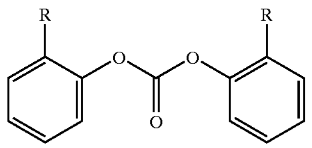

wherein R is the electronegative substituent. Preferred electronegative substituents are carbonyl-containing groups, nitro groups, and halo groups. Symmetrical activated aromatic carbonates of this type may be synthesized by the reaction of an appropriate ortho-substituted phenol with phosgene.

Symmetrical activated aromatic carbonates for use in compositions and methods in accordance with the invention may also be made either by reaction of two equivalents of an appropriate "activated" or ortho-substituted phenyl chloroformate with a bisphenol, such as bisphenol A, or by reaction of a bis-chloroformate with two equivalents of an "activated" or appropriate ortho-substituted phenol. Where bisphenol A is used, the resulting composition has the following general formula,

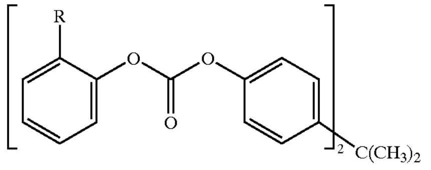

wherein R is as defined above.

Specific examples of symmetrical activated aromatic carbonates which may be used in the compositions and methods of the invention are summarized in Table 1.

As used in the specification and claims of this application, the term "symmetrical non-activated aromatic carbonate" refers to compounds containing two phenolic groups linked through a carbonate bridge. The phenol groups may be substituted or unsubstituted, provided that they do not include electronegative and therefore activating substituents at the ortho position. Suitable symmetrical and asymmetrical non-activated aromatic carbonates may be represented a compound of the formula:

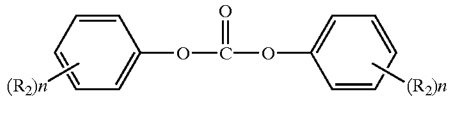

wherein the $R_2$ groups are selected from the group consisting of hydrogen and a $C_1$–$C_{36}$ alkyl, $C_1$–$C_{36}$ alkoxy group, $C_6$–$C_{36}$. aryl, $C_7$–$C_{36}$ aralkyl, and $C_7$–$C_{36}$ aralkyloxy and n is selected from the integers 1–5. Specific symmetrical non-limiting examples of nonactivated aromatic carbonates which may be used in the compositions and methods of the invention include diphenylcarbonate, di-p-cumylphenylcarbonate, di-(tert-butyl phenyl) carbonate, di-(octylphenyl) carbonate, di-(nonylphenyl) carbonate, di-(dodecylphenyl) carbonate, di-(3-pentadecyl)phenyl carbonate (also called cardanol carbonate) and di-(octadecylphenyl)carbonate.

Although it will generally increase the cost without providing a compensating benefit, in addition to the symmetrical carbonates, the end-capping reagent may also include asymmetric activated or non-activated carbonates. Examples of asymmetrical non-activated carbonates include p-cumylphenyl phenyl carbonate, tert-butylphenyl phenyl carbonate, octylphenyl phenyl carbonate, nonylphenyl phenyl carbonate, dodecylphenyl phenyl carbonate, 3-pentadecylphenyl phenyl carbonate. Exemplary asymmetrical activated carbonates have the general formula

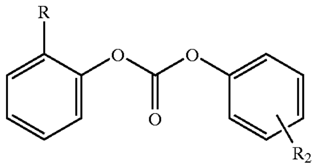

wherein R is an electronegative substituent and $R_2$ is selected from among hydrogen, $C_1$ to $C_{18}$ alkyl, $C_1$ to $C_{18}$ alkoxy, $C_6$ to $C_{18}$ aryl, $C_7$ to $C_{18}$ aralkyl, and $C_7$ to $C_{18}$ aralkoxy. The mixture of the symmetrical activated aromatic carbonate andsymmetrical non-activated aromatic carbonate may be preformed prior to addition to the melt transesterification reaction, or may be generated in situ by separate addition of the carbonate species to the melt transesterification. This mixture, whether preformed or generated in situ, is referred to herein as the "end-capping reagent." In the case of a pre-formed end-capping reagent, the mixture may be neat, or it may include a suitable solvent, for example PETS, or a mixture of toluene and acetone.

The relative amounts of the two types of carbonates (activated and non-activated) in the end-capping reagent can be varied depending on the product characteristics desired. Higher amounts of activated carbonate will increase the degree of coupling obtained, while higher relative amounts of the non-activated carbonate can be used to enhance the amount of chain termination. In general, the mole ratio of non-activated to activated carbonates will suitably range from 10:90 to 90:10.

Preparation of the end-capping reagent In one embodiment of the invention, the symmetrical carbonates (both activated and non-activated) are prepared using a method in which two equivalents of a substituted phenol is reacted with one equivalent of phosgene in an interfacial reaction using water and a chlorinated solvent such as methylene chloride and in the presence of a base such as sodium hydroxide to neutralize the liberated HCl. Additional catalysts may be employed in this reaction to facilitate the condensation reaction. In one embodiment, the condensation catalyst is triethyl amine, quaternary alkyl ammonium salt, or mixtures thereof. After completion of the condensation reaction, the organic product phase is washed with aqueous acid and then with water until the washings are neutral. The organic solvent may be removed by distillation and the end-capper is crystallized or distilled and recovered.

End-capping Reaction in the Polycarbonate Production Process: The end-capping reagent of the present invention is used to rapidly cap the terminal hydroxy group of the polycarbonate. The ortho-substituted phenols generated in the capping reaction are less reactive than phenol in back-biting reactions, which lead to molecular weight degradation of the polycarbonate. Therefore, the by-product phenols are removed from the terminal-blocked polycarbonate by distillation to the over-head system using conventional means (i.e., freeze traps using chilled water as a coolant) where they can be condensed to expedite the end-capping reaction at high yields.

It should be noted that the end-capped polycarbonate may still contain small amounts of any unrecovered phenols, any unreacted end-capping reagent along with by-products of any side reactions to the end-capping reactions, e.g. terminal 2-(alkoxycarbonyl)phenyl groups and the like. In one embodiment, the end-capped polycarbonate contains about less than 500 ppm of ortho-substituted phenols and about 500 ppm of unreacted terminal blocking agent of the present invention. In another embodiment, the end-capped polycarbonate contains about 2,500 ppm or less of terminal 2-(alkoxycarbonyl)phenyl groups.

In one embodiment, the ortho-substituted phenol by-product of the following formula is recovered from the overhead system and reused to prepare new end-capping reagents.

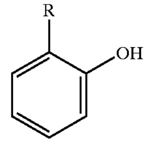

In accordance with the method of the invention, end-capping reagent containing activated and non-activated carbonates is combined with a preformed polycarbonate polymer having free hydroxyl end groups. The preformed polycarbonate polymer may be any type of polycarbonate, and can be formed by either melt transesterification or an interfacial process, although most commonly the preformed polycarbonate polymer would be formed from the melt transesterification process.

Melt Polycarbonate Process The process of the present invention is a melt or transesterification process. The production of polycarbonates by transesterification is well-known in the art and described, for example, in Organic Polymer Chemistry by K. J. Saunders, 1973, Chapman and Hall Ltd., as well as in a number of U.S. patents, including U.S. Pat. Nos. 3,442,854; 5,026,817; 5,097,002; 5,142,018; 5,151,491; and 5,340,905.

In the melt process, polycarbonate is produced by the melt polycondensation of aromatic dihydroxy compounds (A) and carbonic acid diesters (B). The reaction can be carried out by either a batch mode or a continuous mode. The apparatus in which the reaction is carried out can be any suitable type of tank, tube, or column. The continuous processes usually involve the use of one or more CSTR's and one or more finishing reactors.

Examples of the aromatic dihydroxy compounds (A) include bis(hydroxyaryl) alkanes such as bis(4-hydroxyphenyl)methane; 1,1 -bis(4-hydroxyphenyl)ethane; 2,2-bis(4-hydroxyphenyl)propane (also known as bisphenol A); 2,2-bis(4-hydroxyphenyl)butane; 2,2-bis(4-hydroxyphenyl)octane; bis(4-hydroxyphenyl) phenylmethane; 2,2-bis(4-hydroxy-1-methylphenyl) propane; 1,1-bis(4-hydroxy-t-butylphenyl)propane; and 2,2-bis(4-hydroxy-3-bromophenyl)propane; bis (hydroxyaryl) cycloalkanes such as 1,1-(4-hydroxyphenyl)cyclopentane and 1,1-bis(4-hydroxyphenyl)cyclohexane; dihydroxyaryl ethers such as 4,4'-dihydroxydiphenyl ether and 4,4'dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone. In one embodiment, the aromatic dihydroxy compound is bisphenol A (BPA).

Examples of the carbonic acid diesters (B) include diphenyl carbonate; ditolyl carbonate; bis(chlorophenyl) carbonate; m-cresyl carbonnate; and dinaphthyl carbonate. In one embodiment of an industrial process, diphenyl carbonate (DPC) is used.

The carbonic diester component may also contain a minor amount, e.g., up to about 50 mole % of a dicarboxylic acid or its ester, such as terephthalic acid or diphenyl isophthalate, to prepare polyesterpolycarbonates. In preparing the polycarbonates, usually about 1.0 mole to about 1.30 moles of carbonic diester are utilized for every 1 mole of the aromatic dihydroxy compound. In one embodiment, about 1.01 moles to about 1.20 moles of the carbonic diester is utilized.

Optional Terminators/End-capping Agents. In one embodiment of the melt process, additional/optional terminators or end-capping agents of the prior art may also be used. Examples of terminators include phenol, p-tert-butylphenol, p-cumylphenol, octylphenol, nonylphenol and other end-capping agents well-known in the art.

Optional Branching Agents. In one embodiment of the process of the present invention, branching agents are used as needed. Branching agents are well-known and may comprise polyfunctional organic compounds containing at least three functional groups, which may be hydroxyl, carboxyl, carboxylic anhydride, and mixtures thereof. Specific examples include trimellitic anhydride, tris-p-hydroxy phenyl ethane, isatin-bis-phenol, tris-phenol TC (1,3,5-tris((p-hydroxyphenyl) isopropyl)benzene), tris-phenol PA (4(4(1, 1-bis(p-hydroxyphenyl)-ethyl) alpha,alpha-dimethyl benzyl)phenol, and benzophenone tetracarboxylic acid. Optional catalysts. The polycarbonate synthesis may be conducted in the presence of a catalyst to promote the transesterification reaction. Examples include alkali metals and alkaline earth metals by themselves or as oxides, hydroxides, amide compounds, alcoholates, and phenolates, basic metal oxides such as ZnO, PbO, and $Sb_2 O_3$, organotitanium compounds, soluble manganese compounds, nitrogen-containing basic compounds and acetates of calcium, magnesium, zinc, lead, tin, manganese, cadmium, and cobalt, and compound catalyst systems such as a nitrogen-containing basic compound and a boron compound, a nitrogen-containing basic compound and an alkali (alkaline earth) metal compound, and a nitrogen-containing basic compound, an alkali (alkaline earth) metal compound, and a boron compound.

In one embodiment of the invention, the transesterification catalyst is a quaternary ammonium compound or a quaternary phosphonium compound. Non-limiting examples of these compounds include tetramethyl ammonium hydroxide, tetramethyl ammonium acetate, tetramethyl ammonium fluoride, tetramethyl ammonium tetraphenyl borate, tetraphenyl phosphonium fluoride, tetraphenyl phosphonium tetraphenyl borate, tetrabutyl phosphonium hydroxide, tetrabutyl phosphonium acetate and dimethyl diphenyl ammonium hydroxide.

The above-mentioned catalysts may each be used by themselves, or, depending on the intended use, two or more types may be used in combination. When more than one catalyst is employed, each may be incorporated into the melt at a different stage of the reaction. In one embodiment of the invention, part or all of one catalyst is added together with the end-capping reagent.

The appropriate level of catalyst will depend in part on how many catalysts are being employed, e.g., one or two. In general, the total amount of catalyst is usually in the range of about $1\times10^{-8}$ to about 1.0 mole per mole of the dihydroxy compound. In one embodiment, the level is in the range of about $1\times10^{-5}$ to about $5\times10^{-2}$ mole per mole of dihydroxy compound. When more than one catalyst is employed, each may be incorporated into the melt at a different stage of the reaction.

Other Optional Components in the Polycarbonate

In the present invention, the polycarbonate obtained may further contain at least one of a heat stabilizer, an ultraviolet absorbent, a mold releasing agent, a colorant, an anti-static agent, a lubricant, an anti-fogging agent, a natural oil, a synthetic oil, a wax, an organic filler and an inorganic filler, which are generally used in the art.

Adding the end-capping agent to the melt process The method of adding the end-capping agent to polycarbonate is not specially limited. For example, the end-capping agent may be added to the polycarbonate as a reaction product in a batch reactor or a continuous reactor system. In one embodiment, the end-capping agent is added to the melt polycarbonate just before or after a later reactor, i.e., a polymerizer, in a continuous reactor system. In a second embodiment, the end-capping agent is by reactive extrusion after the last polymerizer in the continuous reactor system. In a third embodiment, it is added between the $1^{st}$ and $2^{nd}$ polymerizer in a continuous reactor system. In yet another embodiment, the end-capping agent is added between the $2^{nd}$ reactor and the $1^{st}$ polymerizer.

The amount of end-capping reagent appropriately utilized can be quantified with reference to the amount of free hydroxyl end groups in the pre-formed polycarbonate polymer. In general, the mole ratio of total carbonate to free hydroxyl end groups is within the range of from 0.5 to 2.0, depending on the level of end-capping desired.

In some reactor systems, it may be difficult to reach the desired equilibrium ratio of introduced or incorporated non-activated and activated end-groups (the non-activated end groups are preferentially present at equilibrium) due to poor mixing, short residence time, or rapid volatilization of one component. In such a case the ratio of introduced non-activated to activated end groups can be favorably increased by melt mixing the activated and non-activated aromatic carbonates together in the presence of a small amount of basic catalyst (such as tetramethylammonium hydroxide) to produce a scrambled product consisting of a pre-equilibrated or statistical mixture of carbonates. The invention will now be further described with reference to the following non-limiting examples.

Starting Material Polycarbonate

In all examples, either starting polycarbonate grade A, B, C, or D was used. The starting materials were prepared by a melt process in a continuous reactor system with the following properties:

| | Polycarbonate A | Polycarbonate B | Polycarbonate C | Polycarbonate D |
|---|---|---|---|---|
| Weight-average molecular weight Mw: | $18.3\times10^3$ g/mole | $8.11\times10^3$ g/mole | $30.5\times10^3$ g/mole* | $4.6\times10^3$ g/mole |
| Number-average molecular weight Mn: | $8.34\times10^3$ g/mole | $4.05\times10^3$ g/mole | $14.1\times10^3$ g/mole* | $2.5\times10^3$ g/mole |
| Free OH content: | 670 ppm | 4020 ppm | 834 ppm | 7030 ppm |
| End-cap ratio | 84.6% | 52.1% | 81.0% | 47.6% |

*Polystyrene standards

In the Examples, the following measurements were made.

a) Molecular weight: Mw and Mn were measured by GPC analysis of 1 mg/ml polymer solutions in methylene chloride versus polystyrene standards. Unless otherwise stated the measured polycarbonate Mw and Mn values were then corrected for the difference in retention volume between polycarbonate and polystyrene standards.

b) Free-OH content was measured by UV/Visible analysis of the complexes formed from the polymer with $TiCl_4$ in methylene chloride solution. In some cases the Free OH content was measured by direct infrared or $^{31}P$ NMR methods.

c) End-cap levels were calculated from the free OH content and Mn values.

d)Incorporation levels of specific end groups were determined by NMR.

e)The glass transition temperature of some end-capped polycarbonates was measured by differential scanning calorimetry.

EXAMPLE 1

Symmetrical carbonates (both activated and non-activated) can be prepared using a method in which a substituted phenol with phosgene. This reaction is exemplified herein by the synthesis of methyl salicylate carbonate which was synthesized as follows.

A 500 ml, 5-neck Morton flask equipped with an overhead stirrer, a gas inlet tube connected to a phosgene cylinder through a flow control valve, a reflux condenser, a pH probe and a base addition tube is charged with 0.2 mol of methyl salicylate, 120 ml of methylene chloride, 90 ml of water and 0.1–1% of a condensation catalyst (for example triethylamine or a quaternary ammonium halide salt). Phosgene is introduced at a rate of about 0.6 g/min and the pH of the aqueous phase is maintained at about 10.0 by addition of 50% sodium hydroxide solution through the base addition tube. When a total of 1.25 equivalents ofphosgene has been added, a nitrogen purge is introduced through the phosgene delivery tube and continued for 10 minutes until no phosgene or chloroformate is detected suing 4-nitrobenzylpyridine test paper in either the overhead steam or the reaction solution. The aqueous phase is discarded and the organic phase is washed twice with 100 ml of 10% HCl followed by washed with 100 ml of water until the washings are neutral. Solvent is removed on a rotary evaporator and the residue is purified by crystallization from ethanol or a mixture of methylene chloride and hexane or heptane. The yield is typically 75–95% depending on recrystallization efficiency.

EXAMPLE 2

A batch reactor tube was charged with 25 g of the pre-formed polycarbonate A, 0.1160 g (ratio end-capper to free OH=0.55) diphenyl carbonate and 0.1790 g (ratio end-capper to free OH=0.55) bis-(methyl salicyl) carbonate under nitrogen. The mixture was heated to a temperature of 300° C. and stirred for 20 minutes. After the melt mixing stage, vacuum was applied to the system to a pressure of 0.5 mbar, and the reaction continued for 20 minutes. After the reaction, the polymer was sampled from the reaction tube. As summarized in Table 2, the end-cap ratio of the sample polycarbonate A was increased from 84.6% to 93.1%.

EXAMPLE 3

A batch reactor tube was charged with 50 g of the pre-formed polycarbonate A, 0.3481 g (ratio end-capper to free OH=0.825) diphenyl carbonate and 0.1790 g (ratio end-capper to free OH=0.275) bis-(methyl salicyl) carbonate under nitrogen. The mixture was heated to a temperature of 300° C. and stirred for 20 minutes. After the melt mixing stage, vacuum was applied to the system to a pressure of 0.5 mbar, and the reaction continued for 20 minutes. After the reaction, the polymer was sampled from the reaction tube. As summarized in Table 2, the end-cap ratio of the sample polycarbonate was increased from 84.6% to 89.0%.

EXAMPLE 4

A batch reactor tube was charged with 50 g of the polycarbonate A, 0.1160 g (ratio end-capper to free OH=0.275) diphenyl carbonate and 0.1790 g (ratio end-capper to free OH=0.275) bis-(methyl salicyl) carbonate and 0.2950 g (ratio end-capper to free OH=0.55) methyl salicyl phenyl carbonate under nitrogen. The mixture was heated to a temperature of 300° C. and stirred for 20 minutes. After the melt mixing stage, vacuum was applied to the system to a pressure of 0.5 mbar, and the reaction continued for 20 minutes. After the reaction, the polymer was sampled from the reaction tube. As summarized in Table 2, the end-cap ratio of the sample polycarbonate was increased from 84.6% to 92.7%.

EXAMPLE 5

A batch reactor tube was charged with 25 g of the pre-formed polycarbonate B, 0.4436 g(ratio endcapper to free-OH=0.5) di(meta-pentadecylphenyl) carbonate and 0.2307 g(ratio endcapper to free-OH=0.5) bis-(methyl salicyl) carbonate under nitrogen. The mixture was heated to a temperature of 300° C. and stirred for 20 minutes. After the melt mixing stage vacuum was applied to the system to a pressure of 0.5 mbar, and the reaction continued for 20 minutes. After the reaction the polymer was sampled from the reaction tube. As summarized in Table 2, the endcap ratio of the sample polycarbonate was increased from 52.1% to 87.2% and 1.12 mole percentage of the meta-pentadecylphenol was incorporated in the end-capped polymer.

EXAMPLE 6

A batch reactor tube was charged with 25 g of the pre-formed polycarbonate B, 0.4436 g(ratio endcapper to free-OH=0.5) di(meta-pentadecylphenyl) carbonate and 0.3370 g(ratio endcapper to free-OH=0.5) bis-(benzyl salicyl) carbonate under nitrogen. The mixture was heated to a temperature of 300° C. and stirred for 20 minutes. After the melt mixing stage vacuum was applied to the system to a pressure of 0.5 mbar, and the reaction continued for 20 minutes. After the reaction the polymer was sampled from the reaction tube. As summarized in Table 2, the endcap ratio of the sample polycarbonate was increased from 52.1% to 83.3% and 0.72 mole percentage of the meta-pentadecylphenol was incorporated in the end-capped polymer.

EXAMPLE 7

A batch reactor tube was charged with 25 g of the pre-formed polycarbonate B, 0.3139 g(ratio endcapper to free-OH=0.5) di(para-cumylphenyl) carbonate and 0.3370 g(ratio endcapper to free-OH=0.5) bis-(benzyl salicyl) carbonate under nitrogen. The mixture was heated to a temperature of 300° C. and stirred for 20 minutes. After the melt mixing stage vacuum was applied to the system to a pressure of 0.5 mbar, and the reaction continued for 20 minutes. After the reaction the polymer was sampled from the reaction tube. As summarized in Table 2, the endcap ratio of the sample polycarbonate was increased from 52.1% to 84.6% and 0.69 mole percentage of the p-cumylphenol was incorporated in the end-capped polymer.

EXAMPLE 8

A batch reactor tube was charged with 25 g of the pre-formed polycarbonate B, 0.3139 g(ratio endcapper to free-OH=0.5) di(para-cumylphenyl) carbonate and 0.2307 g(ratio endcapper to free-OH=0.5) bis-(methyl salicyl) carbonate under nitrogen. The mixture was heated to a temperature of 300° C. and stirred for 20 minutes. After the melt mixing stage vacuum was applied to the system to a pressure of 0.5 mbar, and the reaction continued for 20 minutes. After the reaction the polymer was sampled from the reaction tube. As summarized in Table 2, the endcap ratio of the sample polycarbonate was increased from 52.1% to 85.9% and 0.86 mole percentage of the p-cumylphenol was incorporated in the end-capped polymer.

Comparative Example 1

Example 2 was repeated, but instead of diphenylcarbonate and bis-(methyl salicyl) carbonate no end-capper was charged to the reactor tube. The results are summarized in Table 2.

Comparative Example 2

Example 2 was repeated, but instead of diphenylcarbonate and bis-(methyl salicyl) carbonate, 0.2321 g (ratio endcapper/Free OH=1.1) diphenyl carbonate was charged to the reactor tube. The results are summarized in Table 2.

Comparative Example 3

Example 2 was repeated, but instead of diphenylcarbonate and bis-(methyl salicyl) carbonate, 0.2950 g (ratio endcapper/Free OH=1.1) methyl salicyl phenyl carbonate was charged to the reactor tube. The results are summarized in Table 2.

Comparative Example 4

Example 5 was repeated but instead of using di(meta-pentadecylphenyl) carbonate and bis-(methyl salicyl) carbonate no endcapper is charged to the reactor tube. The results are summarized in Table 2.

Comparative Example 5

Example 5 was repeated but instead of using di(meta-pentadecylphenyl) carbonate and bis-(methyl salicyl) carbonate 0.4436 g (ratio endcapper to free-OH=0.5) of di(meta-pentadecylphenyl) carbonate is charged to the reactor tube. The results are summarized in Table 2.

Comparative Example 6

Example 5 was repeated but instead of using di(meta-pentadecylphenyl) carbonate and bis-(methyl salicyl) carbonate 0.2127 g (ratio endcapper to free-OH=0.5) of meta-pentadecylphenol is charged to the reactor tube. The results are summarized in Table 2.

EXAMPLE 9

End-capping reagent was prepared from a mixture of DPC and bis-(methyl salicyl) carbonate (MSC) such that the mole fraction of MSC was 0.33. The solvent was 1/1 acetone/toluene and the concentration of all species was 0.375 molar. A 1 ml aliquot contained a molar amount of carbonates equivalent to the moles of free OH groups in 20 grams of the preformed polycarbonate A.

A melt transesterification reaction was carried out in a 100 milliliter glass batch reactor equipped with a solid nickel helical agitator. The reactor was charged with Polycarbonate A. No catalyst was added as there was residual catalyst present in the resin ([$Na_{active}$]=50–150 ppb). The reactor was then assembled, sealed and the atmosphere was exchanged with nitrogen. The reactor was brought to near atmospheric pressure and submerged into a fluidized bath which was at 300° C. After 15 minutes, agitation was begun at 150 rpm. After an additional five minutes, the reactants were fully melted and a homogeneous mixture was obtained. At this point, 2 ml of the endcapping solution was injected into the melt. The pressure was then reduced to 1 mm Hg. After 30 minutes, the reactor was removed from the sand bath, and the melt was pulled from the reactor and dropped into liquid nitrogen to quench the reaction.

Mn (number average molecular weight) was obtained by GPC analysis of the end-capped polycarbonate. End-group concentration was determined by IR analysis of the polymer end-groups. Results are presented in Table 2.

EXAMPLE 10

Example 9 was repeated but instead of using a mole fraction of 0.33 a mole fraction of 0.66 MSC was used. The results are summarized in Table 2.

Comparative Example 7

Example 9 was repeated but instead of using a mole fraction of 0.33 no MSC was used. The results are summarized in Table 2.

Comparative Example 8

Example 9 was repeated but instead of using a mole fraction of 0.33 a mole fraction of 1.0 MSC was used. The results are summarized in Table 2.

EXAMPLE 11

A melt transesterification reaction was carried out in a 90 milliliter stainless steel batch reactor equipped with a stainless steel twisted stir paddle and borosilicate glass reactor head. The polycarbonate C (31.0 g), bis(methyl salicyl) carbonate (0.49 g, molar ratio to free OH=0.98), and di(meta-pentadecylphenyl) carbonate (0.46 g, molar ratio to free OH=0.48) were quickly added into the well of the preheated reactor (180° C). Then the reactor was then placed a 300° C. pre-heated aluminum jacket and the remaining apparatus assembled under gentle argon purge. Initially, the melt was thermally equilibrated by stirring at 10 to 80 RPM under a slight argon purge for 5 minutes. Then, while stirring at 40 to 80 RPM, the pressure over the reactor was reduced over 5 minutes to 0.5 to 2 Torr. Stirring continued for 20 minutes under vacuum and volatiles were collected in a cold-trap. The reactor was then repressurized with argon and molten resin immediately ejected from the bottom of the reactor onto a collection tray.

A resin was obtained and characterized as follows: Mw=28851, Mn=13571 (PS standards), Tg=134° C. Subsequent reprecipitation (using methanol and methylene chloride) provided a white powder with incorporated alkylphenol endcapper=0.98 mol %, free OH level=278 ppm, and endcap level=93%.

EXAMPLE 12

Example 11 was repeated but the stainless steel batch reactor was charged instead with polycarbonate C (30 g), bis(methyl salicyl) carbonate (0.97 g, molar ratio to free OH=1.99), and di(octadecylphenyl) carbonate (0.53 g, molar ratio to free OH=0.50). An end-capped resin was obtained and characterized as follows: Mw=27796 and Mn=13791 (PS standards), Tg=132° C. Subsequent reprecipitation provided a white powder with incorporated alkylphenol endcapper=0.58 mol %, free OH level=19 ppm, and endcap level=99.5%.

EXAMPLE 13

Example 11 was repeated but the stainless steel batch reactor was charged instead with polycarbonate C (30 g), bis(methyl salicyl) carbonate (0.97 g, molar ratio to free OH=2.0), and di(4-tert-butylphenyl) carbonate (0.24 g, molar ratio to free OH=0.50). An end-capped resin was obtained and characterized as follows: Mw=27361 and Mn=13520 (PS standards), Tg=137° C. Subsequent reprecipitation provided a white powder with incorporated alkylphenol endcapper=1.51 mol %, free OH level=16 ppm, and endcap level=99.6%.

EXAMPLE 14

Example 11 was repeated but the stainless steel batch reactor was charged instead with polycarbonate C (30 g), bis(methyl salicyl) carbonate (0.97 g, molar ratio to free OH=2.0), and di(meta-pentadecylphenyl) carbonate (0.47 g, molar ratio to free OH=0.50). An end-capped resin was obtained and characterized as follows: Mw=30814 and Mn=15210 (PS standards), Tg=136° C. Subsequent reprecipitation provided a white powder with incorporated alkylphenol endcapper=1.08 mol %, free OH level=54 ppm, and endcap level=98.6%.

Comparative Example 9

Example 12 was repeated but the stainless steel batch reactor was charged instead with polycarbonate C (31 g), bis(methyl salicyl) carbonate (0.49 g, molar ratio to free OH=0.98), and no bis-alkylphenyl carbonate endcapper. An end-capped resin was obtained and characterized as follows: Mw=39090 and Mn=17314 (PS standards), Tg=145° C., incorporated methyl salicylate endcapper=0.74 mol %, free OH level=37 ppm, and endcap level=98.9%.

Comparative Example 10

Example 12 was repeated but the stainless steel batch reactor was charged instead with polycarbonate C (31 g), no bis(methyl salicyl) carbonate, and di(meta-pentadecylphenyl) carbonate (0.46 g, molar ratio to free OH=0.48). An end-capped resin was obtained and characterized as follows: Mw=31358 and Mn=14138 (PS standards), Tg=133° C., incorporated alkylphenol=1.22 mol %, free OH level=450 ppm, and endcap level=89%.

EXAMPLE 15

In this example, a continuous reaction system was used. The apparatus consists of one monomer mix agitation tank, two pre-polymerization tanks and one horizontally agitated polymerization tank. Bisphenol A and diphenyl carbonate in a molar ratio of 1.08:1 were continuously supplied to a heated agitation tank where a uniform solution was produced. About 250 eq ($2.5*10^{-4}$ mol/mol bisphenol A) tetramethylammonium hydroxide and 1 eq ($1.10^{-6}$ mol/mol bisphenol A) of NaOH were added to the solution as catalysts in the first pre-polymerization tank. The solution was then successively supplied to the next pre-polymerization tank and the horizontally agitated polymerization tank, arranged in sequence, and the polycondensation was allowed to proceed to produce a starting polymer "D" emerging from the outlet stream of the second pre-polymerization tank for Example 14 with a Mw of 4439+289 g/mol, an Mn of 2407+121 g/mol, and an endcap level of about 48%.

For example 15, a 50:50 molar ratio of diphenylcarbonate and bis-(methyl salicyl) carbonate was added by means of a heated static mixer to the molten polymer outlet stream of the pre-polymerization tanks (inlet stream of the horizontally agitated polymerization tank) in an amount of 1.97 mass % relative to the molten polymer stream.

EXAMPLE 16

A repeat of Example 15 except that a 50:50 molar ratio of diphenylcarbonate and bis-(benzyl salicyl) carbonate in an amount of 2.55 mass % relative to the molten polymer stream was used.

TABLE 1

Examples of Symmetrical Activated Carbonates

| Structure | Name (abbreviation) | Data |
|---|---|---|
| 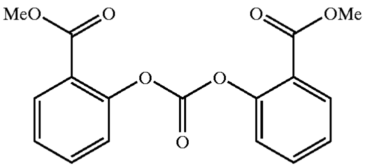 | Bis-methylsalicylate carbonate (bMSC) | MW = 330 mp109° C.[1] |
| 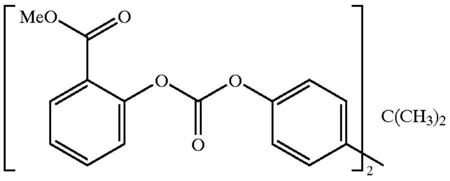 | BPA-bis-methylsalicylate carbonate | MW = 572 |
| 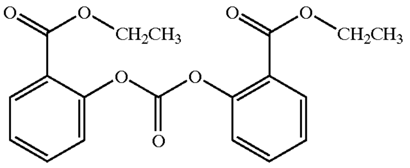 | Bis-ethyl salicylate carbonate | MW = 358 |
| 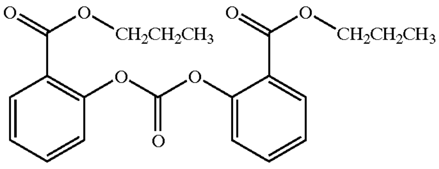 | Bis-propyl salicylate carbonate (bPrSC) | MW = 386 mp = 57–58° C. |
| 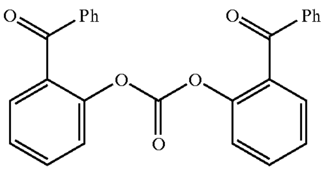 | bis-2-benzoylphenyl carbonate | MW = 442 mp = 111–112° C. |

TABLE 1-continued

Examples of Symmetrical Activated Carbonates

| Structure | Name (abbreviation) | Data |
|---|---|---|
| 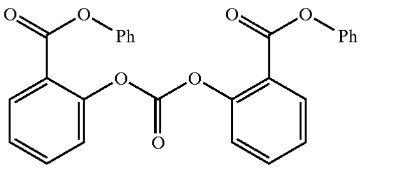 | Bis-phenyl salicyl carbonate (bPhSC) | MW = 454 |
| 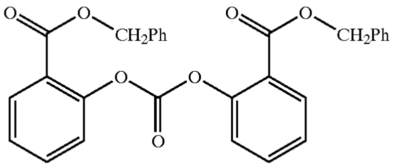 | Bis-benzyl salicyl carbonate (bBSC) | MW = 482<br>mp = 68.5–71° C. |

TABLE 2

Examples of End-Capping

| Example | PC Type | Name and structure | Endcapper EC/Free-OH mole-ratio | Mw (g/ mole) | Mn (g/ mole) | Endcap ratio (%) | mole % Incorp. |
|---|---|---|---|---|---|---|---|
| Example 2 | A | Di-phenyl carbonate + | 0.66 | 21006 | 9233 | 93.1 | NA |
| | | bis-methyl salicyl carbonate | 0.55 | | | | |
| | | 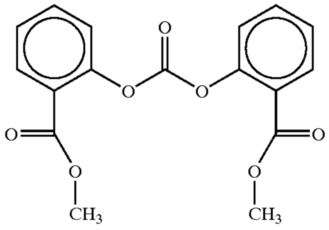 | | | | | |
| Example 3 | A | Di-phenyl carbonate + | 0.825 | 20121 | 8936 | 89.0 | NA |
| | | bis-methyl salicyl carbonate | 0.275 | | | | |
| Example 4 | A | Di-phenyl carbonate + | 0.275 | 19690 | 8782 | 92.7 | NA |
| | | bis-methyl salicyl carbonate | 0.275 | | | | |
| | | Methyl salicyl phenyl carbonate | 0.55 | | | | |
| Example 5 | B | Di(m-pentadecylphenyl) Carbonate + | 0.5 | 18123 | 9112 | 87.2 | 1.12 |
| | | bis-benzyl salicyl carbonate | 0.5 | | | | |
| Example 6 | B | Di(m-pentadecylphenyl) Carbonate + | 0.5 | 16144 | 8452 | 83.3 | 0.72 |
| | | bis-benzyl salicyl carbonate | 0.5 | | | | |
| | | 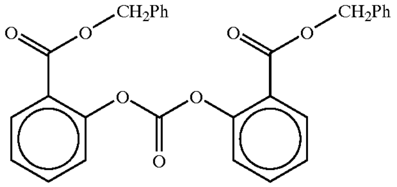 | | | | | |
| Example 7 | B | bis-benzyl salicyl carbonate + | 0.5 | 19968 | 11081 | 84.6 | 0.69 |
| | | di-p-cumylphenylcarbonate | 0.5 | | | | |
| | | 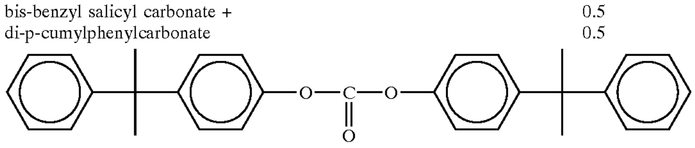 | | | | | |
| Example 8 | B | bis-benzyl salicyl carbonate + | 0.5 | 20092 | 10563 | 85.9 | 0.86 |
| | | di-p-cumylphenylcarbonate | 0.5 | | | | |
| Comparative example 1 | A | — | — | 20992 | 11740 | 85.1 | NA |

TABLE 2-continued

Examples of End-Capping

| Example | PC Type | Name and structure | Endcapper EC/Free-OH mole-ratio | Mw (g/ mole) | Mn (g/ mole) | Endcap ratio (%) | mole % Incorp. |
|---|---|---|---|---|---|---|---|
| Comparative example 2 | A | Di Phenyl Carbonate 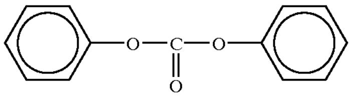 | 1.1 | 21058 | 11692 | 88.1 | NA |
| Comparative example 3 | A | Methyl Salicyl Phenyl Carbonate 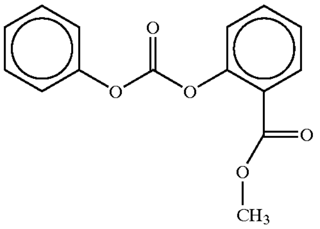 | 1.1 | 18591 | 8233 | 92.0 | NA |
| Comparative example 4 | B | — | — | 17870 | 8171 | 75.9 | NA |
| Comparative example 5 | B | Di(m-pentadecylphenyl) Carbonate 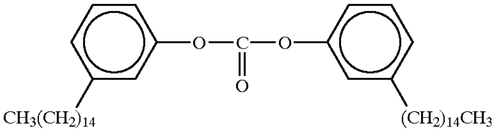 | 0.5 | 9712 | 5152 | 70.6 | 0.48 |
| Comparative example 6 | B | m-pentadecylphenyl 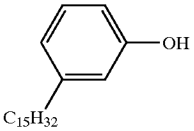 | 0.5 | 9674 | 5257 | 68.4 | 0.32 |
| Example 9 | A | Di-phenyl carbonate +<br>bis-methyl salicyl carbonate | 1.34<br>0.66 | 21193 | 9601 | 92.5 | NA |
| Example 10 | A | Di-phenyl carbonate +<br>bis-methyl salicyl carbonate | 0.66<br>1.34 | 21462 | 9727 | 96.7 | NA |
| Comparative example 7 | A | Di-phenyl carbonate +<br>bis-methyl salicyl carbonate | 2<br>0 | 19894 | 9043 | 87.7 | NA |
| Comparative example 8 | A | Di-phenyl carbonate +<br>bis-methyl salicyl carbonate | 0<br>2 | 22059 | 9975 | 99.4 | NA |
| Example 11 | C | Di(m-pentadecylphenyl) Carbonate +<br>bis-methyl salicyl carbonate | 0.48<br>0.98 | 21462 | 9727 | 96.7 | 0.98 |
| Example 12 | C | Di(octatadecylphenyl) Carbonate + 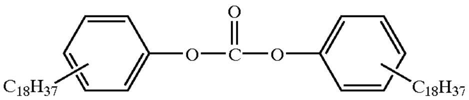 bis-methyl salicyl carbonate | 0.5 | 27796 | 13791 | 99.5 | 0.58 |
| Example 13 | C | Di(t-butylphenyl) Carbonate + 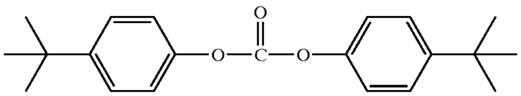 bis-methyl salicyl carbonate | 0.5 | 27361* | 13520* | 99.6 | 1.51 |
| Example 14 | C | Di(m-pentadecylphenyl) Carbonate +<br>bis-methyl salicyl carbonate | 0.5<br>2.0 | 30814* | 15210* | 98.6 | 1.06 |
| Comparative example 9 | C | bis-methyl salicyl carbonate | 0.96 | 39090* | 17314* | 98.9 | 0.74 |
| Comparative example 10 | C | Di(m-pentadecylpohenyl) Carbonate | 0.48 | 31358* | 14138* | 89.0 | 1.22 |
| Example 15 | D | di-phenyl carbonate +<br>bis-methyl salicyl carbonate | —<br>— | 15.5 | 7.19 | 82.7 | NA |

TABLE 2-continued

Examples of End-Capping

| Example | PC Type | Name and structure | Endcapper EC/Free-OH mole-ratio | Mw (g/ mole) | Mn (g/ mole) | Endcap ratio (%) | mole % Incorp. |
|---|---|---|---|---|---|---|---|
| Example 16 | D | 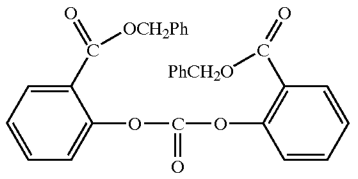 | — | 16.0 | 7.17 | 82.8 | NA |
| Comparative Example 11 | D | — | — | 16.2 | 7.32 | 45.8 | NA |

*Molecular weights versus polystyrene standards.

What is claimed is:

1. A method for preparing an end-capped polycarbonate resin, comprising the step of processing a mixture comprising a polycarbonate having free hydroxyl-end groups and an end-capping reagent in a melt transesterification reaction to produce a polycarbonate resin, wherein the end-capping reagent comprises a mixture of:

(a) at least one species of a symmetrical activated aromatic carbonate, and (b) at least one species of a symmetrical or asymmetrical non-activated aromatic carbonate, whereby said end-capping reagent reacts with at least some of the free hydroxyl end-groups of the polycarbonate to produce an end-capped polycarbonate resin.

2. The method of claim 1, wherein the end-capping reagent contains the activated and non-activated aromatic in a ratio of from 10:90 to 90:10.

3. The method of claim 2, wherein the end-capping reagent is added in an amount such that the mole ratio of total carbonate in the end-capping reagent to free-hydroxyl end groups is from 0.5 to 2.0.

4. The method of claim 1, wherein the end-capping reagent is added in an amount such that the mole ratio of total carbonate in the end-capping reagent to free-hydroxyl end groups is from 0.5 to 2.0.

5. The method of claim 1, wherein the end-capping reagent comprises as a symmetrical activated aromatic carbonate a compound of the formula:

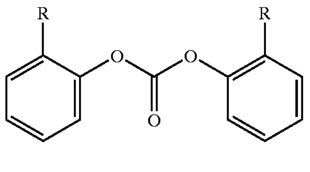

wherein R is an electronegative substituent.

6. The method of claim 5, wherein the electronegative substituents R are selected from among nitro groups, halo groups, and carbonyl-containing groups.

7. The method of claim 6, wherein the electronegative substituents R are selected from among methoxycarbonyl, ethoxycarbonyl, propoxycarbonyl, phenylcarbonyl, phenoxycarbonyl, and benzyloxycarbonyl.

8. The method of claim 7, wherein the electronegative substituents R is methoxycarbonyl.

9. The method of claim 6, wherein the end-capping reagent contains the activated and non-activated aromatic carbonate in a ratio of from 10:90 to 90:10.

10. The method of claim 9, wherein the end-capping reagent is added in an amount such that the mole ratio of total carbonate in the end-capping reagent to free-hydroxyl end groups is from 0.5 to 2.0.

11. The method of claim 6, wherein the end-capping reagent is added in an amount such that the mole ratio of total carbonate in the end-capping reagent to free-hydroxyl end groups is from 0.5 to 2.0.

12. The method of claim 5, wherein the end-capping reagent comprises as a symmetrical non-activated aromatic carbonate a compound of the formula:

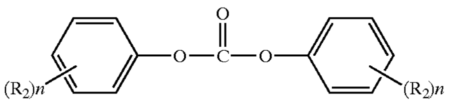

wherein $R_2$ is selected from the group consisting of hydrogen and a $C_1$–$C_{36}$ alkyl, $C_2$–$C_{36}$ alkoxy group, $C_6$–$C_{36}$. aryl, $C_7$–$C_{36}$ aralkyl, and $C_7$–$C_{36}$ aralkyloxy and n is selected from the integers 1–5.

13. The method of claim 12, wherein the end-capping reagent comprises as a symmetric non-activated aromatic carbonate a compound selected from among diphenylcarbonate, di-p-cumylphenylcarbonate, di-(tert-butylphenyl)carbonate, di-(octadecylphenyl)carbonate, di-(nonylphenyl) carbonate, di-(dodecyl phenyl)carbonate, di-(3-pentadecylphenyl)carbonate (also called cardanol carbonate) and di-(octadecylphenyl)carbonate.

14. The method of claim 13, wherein the end-capping reagent comprises as a symmetric non-activated aromatic carbonate a compound selected from among diphenylcarbonate, di-p-cumylphenylcarbonate, di-(tert-butylphenyl)carbonate, di-(3-pentadecylphenyl)carbonate (also called cardanol carbonate) and di-(octadecylphenyl) carbonate.

15. The method of claim 1, wherein the end-capping reagent comprises as a symmetrical activated aromatic carbonate a compound of the formula:

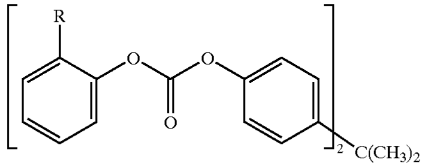

wherein R is an electronegative substituent.

16. The method of claim 15, wherein the electronegative substituents R are selected from among nitro groups, halo groups, and carbonyl-containing groups.

17. The method of claim 16, wherein the end-capping reagent contains the activated and non-activated aromatic carbonate in a ratio of from 10:90 to 90:10.

18. The method of claim 17, wherein the end-capping reagent is added in an amount such that the mole ratio of total carbonate in the end-capping reagent to free-hydroxyl end groups is from 0.5 to 2.0.

19. The method of claim 18, wherein the end-capping reagent is added in an amount such that the mole ratio of total carbonate in the end-capping reagent to free-hydroxyl end groups is from 0.5 to 2.0.

20. The method of claim 15, wherein the end-capping reagent comprises as a symmetrical non-activated aromatic carbonate a compound of the formula:

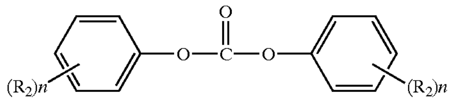

wherein $R_2$ is selected from the group consisting of hydrogen and a $C_1$–$C_{36}$ alkyl, $C_1$–$C_{36}$ alkoxy group, $C_6$–$C_{36}$. aryl, $C_7$–$C_{36}$ aralkyl, and $C_7$–$C_{36}$ aralkyloxy and n is selected from the integers 1–5.

21. The method of claim 20, wherein the end-capping reagent comprises as a symmetric non-activated aromatic carbonate a compound selected from among diphenylcarbonate, di-p-cumylphenylcarbonate, di-(tert-butylphenyl)carbonate, di-(octadecylphenyl)carbonate, di-(nonylphenyl) carbonate, di-(dodecylphenyl)carbonate, di-(3-pentadecylphenyl)carbonate (also called cardanol carbonate) and di-(octadecylphenyl)carbonate.

22. The method of claim 21, wherein the end-capping reagent comprises as a symmetric non-activated aromatic carbonate a compound selected from among diphenylcarbonate, di-p-cumylphenylcarbonate, di-(tert-butylphenyl)carbonate, di-(3-pentadecylphenyl)carbonate (also called cardanol carbonate) and di-(octadecylphenyl) carbonate.

23. The method of claim 1, wherein the end-capping reagent comprises as a symmetrical non-activated aromatic carbonate a compound of the formula:

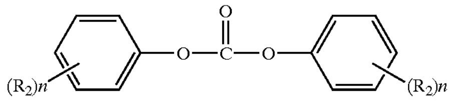

wherein $R_2$ is selected from the group consisting of hydrogen and a $C_1$–$C_{36}$ alkyl, $C_1$–$C_{36}$ alkoxy group, $C_6$–$C_{36}$. aryl, $C_7$–$C_{36}$ aralkyl, and $C_7$–$C_{36}$ aralkyloxy and n is selected from the integers 1–5.

24. The method of claim 23, wherein the end-capping reagent comprises as a symmetric non-activated aromatic carbonate a compound selected from among diphenylcarbonate, di-p-cumylphenylcarbonate, di-(tert-butylphenyl)carbonate, di-(octadecylphenyl)carbonate, di-(nonylphenyl) carbonate, di-(dodecylphenyl)carbonate, di-(3-pentadecylphenyl)carbonate (also called cardanol carbonate) and di-(octadecylphenyl)carbonate.

25. The method of claim 24, wherein the end-capping reagent comprises as a symmetric non-activated aromatic carbonate a compound selected from among diphenylcarbonate, di-p-cumylphenylcarbonate, di-(tert-butylphenyl)carbonate, di-(3-pentadecylphenyl)carbonate (also called cardanol carbonate) and di-(octadecylphenyl) carbonate.

26. The method according to claim 1, wherein the end-capping reagent is added to the polycarbonate in a reactor system of the continuous or semi-continuous type.

27. The process according to claim 26, wherein the reactor system consists of two or more reactors in series.

28. The process according to claim 27, wherein the end-capping reagent is added to the polycarbonate using a static mixer.

29. The process according to claim 1, wherein the formed polycarbonate has a content of ortho-substituted phenols generated in the terminal blocking reaction of 500 ppm or below.

30. The process according to claim 1, wherein the formed polycarbonate has a content of ortho-substituted phenols generated in the terminal blocking reaction of 100 ppm or below.

31. The process according to claim 1, wherein the formed polycarbonate has a content of end-capping reagent of 500 ppm or below.

32. The process according to claim 1, wherein the formed polycarbonate has a content of end-capping reagent of 100 ppm or below.

33. The process according to claim 1, wherein the formed polycarbonate has a content of terminal 2-(alkoxycarbonyl) phenyl, 2-(phenoxycarbonyl)phenyl, 2-(benzyloxycarbonyl) phenyl, and 2-benzoylphenyl groups of 5,000 ppm or below.

34. The process according to claim 1, wherein the formed polycarbonate has a content of terminal 2-(methoxycarbonyl)phenyl groups of 2,500 ppm or below.

35. The process according to claim 1, wherein the formed polycarbonate has a content of terminal 2-(methoxycarbonyl)phenyl groups of 1,000 ppm or below.

36. An end-capping reagent consisting essentially of a mixture of:

(a) one or more species of symmetrical activated aromatic carbonate, and (b) one or more species of a symmetrical non-activated aromatic carbonate, optionally in solvent.

37. The reagent of claim 36, wherein the end-capping reagent includes as a symmetrical activated aromatic carbonate a compound of the formula:

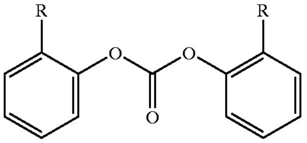

or

-continued

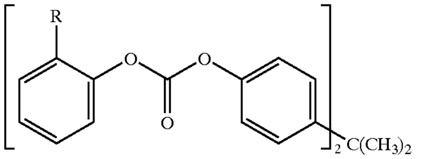

wherein R is an electronegative substituent.

38. The reagent of claim 37, wherein the electronegative substituents R are selected from among nitro groups, halo groups, and carbonyl-containing groups.

39. The reagent of claim 38, wherein the electronegative substituents R are selected from among methoxycarbonyl, ethoxycarbonyl, propoxycarbonyl, phenylcarbonyl, phenoxycarbonyl, and benzyloxycarbonyl.

40. The reagent of claim 39, wherein the electronegative substituents R is methoxycarbonyl.

41. The reagent of claim 38, wherein the end-capping reagent contains the activated and non-activated aromatic carbonates in a ratio of from 10:90 to 90:10.

42. The reagent of claim 38, wherein the end-capping reagent comprises as a symmetrical non-activated aromatic carbonate a compound of the formula:

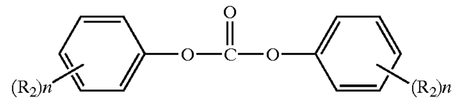

wherein $R_2$ is selected from the group consisting of hydrogen and a $C_1$–$C_{36}$ alkyl, $C_1$–$C_{36}$ alkoxy group, $C_6$–$C_{36}$. aryl, $C_7$–$C_{36}$ aralkyl, and $C_7$–$C_{36}$ aralkyloxy and n is selected from the integers 1–5.

43. The method of claim 42, wherein the end-capping reagent comprises as a symmetric non-activated aromatic carbonate a compound selected from among diphenylcarbonate, di-p-cumylphenylcarbonate, di-(tert-butylphenyl)carbonate, di-(octadecylphenyl)carbonate, di-(nonylphenyl) carbonate, di-(dodecylphenyl)carbonate, di-(3-pentadecylphenyl)carbonate (also called cardanol carbonate) and di-(octadecylphenyl)carbonate.

44. The method of claim 43, wherein the end-capping reagent comprises as a symmetric non-activated aromatic carbonate a compound selected from among diphenylcarbonate, di-p-cumylphenylcarbonate, di-(tert-butylphenyl)carbonate, di-(3-pentadecylphenyl)carbonate (also called cardanol carbonate) and di-(octadecylphenyl) carbonate.

45. The reagent of claim 44, wherein the end-capping reagent contains the activated and non-activated aromatic carbonates in a ratio of from 10:90 to 90:10.

46. The reagent of claim 36, wherein the end-capping reagent contains the activated and non-activated aromatic carbonates in a ratio of from 10:90 to 90:10.

* * * * *